(12) United States Patent
Fliege et al.

(10) Patent No.: US 6,474,720 B1
(45) Date of Patent: Nov. 5, 2002

(54) TARPAULIN FIXTURE

(75) Inventors: Dieter Fliege, Remscheid (DE); Josef Drasch, Winzer (DE); Roger Remmel, Remscheid (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 0 days.

(21) Appl. No.: 09/786,088
(22) PCT Filed: Sep. 1, 1999
(86) PCT No.: PCT/DE99/02825
§ 371 (c)(1),
(2), (4) Date: Jun. 4, 2001
(87) PCT Pub. No.: WO00/12338
PCT Pub. Date: Mar. 9, 2000

(30) Foreign Application Priority Data

Sep. 1, 1998 (DE) .......................... 198 39 769

(51) Int. Cl.⁷ ................................................ B60P 7/02
(52) U.S. Cl. .................................. 296/100.16; 296/181
(58) Field of Search ..................... 296/100.16, 100.11, 296/100.12, 100.17, 100.18, 105, 181, 183, 138; 24/713.6, 115 R, 265 H, 393; 403/282, 281, 280

(56) References Cited

U.S. PATENT DOCUMENTS

| | | | | |
|---|---|---|---|---|
| 3,709,552 A | * | 1/1973 | Broadbent | 160/330 |
| 4,534,089 A | * | 8/1985 | Swan | 24/30.5 P |
| 4,762,361 A | * | 8/1988 | Horton et al. | 16/277 |
| 4,828,316 A | * | 5/1989 | Bennett et al. | 160/84.01 |
| 4,952,009 A | * | 8/1990 | Mountz et al. | 296/181 |
| 5,176,388 A | * | 1/1993 | Horton | 160/348 |
| 5,215,349 A | * | 6/1993 | Horton | 296/181 |
| 5,240,756 A | * | 8/1993 | Finell et al. | 428/193 |
| 5,275,578 A | * | 1/1994 | Adams | 24/713.6 |
| 5,295,779 A | * | 3/1994 | Mihalich et al. | 414/395 |
| 5,544,395 A | * | 8/1996 | Rosenvinge | 24/265 EC |
| 5,564,232 A | * | 10/1996 | Callaway | 135/118 |
| 6,233,782 B1 | * | 5/2001 | Regele et al. | 16/2.1 |

FOREIGN PATENT DOCUMENTS

| | | | | |
|---|---|---|---|---|
| DE | 3345970 A1 | | 6/1985 | .............. B60J/7/10 |
| DE | 0459879 A1 | | 5/1991 | |
| EP | 415014 A1 | * | 3/1991 | .............. B60J/5/06 |
| GB | 2079684 A | * | 1/1982 | ........... B62D/35/00 |
| GB | 2174136 A | * | 10/1986 | .............. B60J/5/06 |
| GB | 2229404 A | | 12/1989 | |

* cited by examiner

Primary Examiner—Kiran Patel
(74) Attorney, Agent, or Firm—Davidson, Davidson & Kappel, LLC

(57) ABSTRACT

The invention relates to a tarpaulin fixture for canopies of utility vehicles, notably folding canopies for vehicle super-structures and containers, comprising a canopy frame made of upper longitudinal booms (2) which cover the length of the loading area and are supported in relation to the vehicle chassis by means of a upright supports and stakes. Bows (3) which can be displaced in the longitudinal direction of the vehicle and support a roof cover, notably a tarpaulin, are supported on the upper longitudinal booms (2) of the canopy frame in such a way that their end faces or caps (4) placed onto same laterally overlap the longitudinal booms (4). Especially side wall tarpaulins are fixed by irremovable clips passing through eyelets or at least recesses in the tarpaulin to support elements, such as the fixing plate of suspension slides or bow caps, arranged at intervals to each other.

12 Claims, 2 Drawing Sheets

TARPAULIN FIXTURE

BACKGROUND OF THE INVENTION

The present invention relates to a tarpaulin fasting on canopies for commercial vehicles, in particular canopies which can be pushed together for vehicle superstructures and containers, comprising a canopy frame including upper longitudinal flanges which span the length of the loading compartment and are supported against the vehicle chassis via upwardly protruding supports and stakes, wherein bows which support a roof covering, in particular a tarpaulin, and can be displaced in the longitudinal direction of the vehicle are supported on the upper longitudinal flanges of the canopy frame in such a manner that their ends or the end caps placed onto the latter grip laterally over the longitudinal flanges, side-wall tarpaulins, in particular, being fastened by means of non-releasable fastening means, which pass through eyelets or at last recesses in the tarpaulin, to support elements which are arranged at distances from one another, such as the fastening plate of hanging sliders or bow end caps and the like.

In the case of fastenings and suspension means, which are known in practice, for side tarpaulins on canopies for vehicle superstructures, in particular also canopies which can be pushed together of vehicle superstructures, the tarpaulins are fastened to a support, such as the fastening plate of hanging sliders or bow end caps and the like, by means of fastening means passing through them, for example rivets. In many cases provision has also already been made, for the purpose of reinforcing the fastening, to use pressure-distributing plates through which rivets or similar fastening means reach and which transmit the holding force of the fastening means over a large area of the tarpaulin. Although fastenings of this type are sufficiently secure for the usual operation of a commercial vehicle, they are not able to withstand relatively high stresses with the required certainty.

In the case of other means of fastening which are known in practice, provision has been made to provide the tarpaulin in its edge region with eyelets and for the fastening means to pass through the said eyelets, which definitely results in a reduction in the risk of the tarpaulin material tearing in the region through which the fastening means pass. None of the known and customary means of fastening side-wall tarpaulins are able with the required certainty to withstand relatively high demands made on the strength of the fastening, as may result, for example from the wind forces which occur in the case of train traffic in the opposite direction when a commercial vehicle is loaded on a train.

SUMMARY OF THE INVENTION

It is an object of the invention to provide a tarpaulin fastening, which tarpaulin fastening can be produced and fitted at an acceptable cost and satisfies high safety requirements.

In the case of the tarpaulin fastening mentioned at the beginning, this object may be achieved according to the invention in that the tarpaulin is fastened to the support elements by means of the eyelets inserted in it or at least U-shaped metal clips which grip around the edge reinforcement and by means of non-releasable fastening means which pass through the said metal clips.

The invention therefore proposes in general to deviate from the previous, direct means of fastening and to use a fastening via a metallic supporting means. This advantageously provides a tarpaulin fastening which satisfies the safety regulations at least of all European railways.

The invention relates in particular to a fastening of the tarpaulin which is distinguished in the most favourable embodiment by the fact that the tarpaulin is grasped in its edge region by a sheet-metal clamp and is fastened by means of the sheet-metal clamp and a fastening means passing through the latter to the bow or the roller carriage or the fastening plate of a hanging slider.

The invention is not restricted here to the admittedly preferred use of a sheet-metal clamp, but in general comprises every form of design of a clamp made from metallic material, provided that the strength of the metallic material is sufficient to satisfy the conditions stipulated for particular transport systems, for example of the so-called piggyback transport of European railways.

In a preferred embodiment of the side-wall-tarpaulin fastening to a vehicle body provision is made for the metal clip to be formed by a strip-shaped sheet-metal material blank which is bent in the shape of a U and in the region of the two ends is provided with a respective passage recess for a fastening means. In order to further increase the strength of the fastening of the side-wall tarpaulin, provision may furthermore be made to provide the tarpaulin in its edge region, or else in the region of the connection to the metal clips, with an edge reinforcement, for example an insert made of tension-proof material, and for the metal clip to have, in the profile base of its U-shape, a bulge serving to receive an edge reinforcement of the tarpaulin.

One design of the tarpaulin fastening which is particularly well suited at least for fastening the side-wall tarpaulin to one of the bows in a longitudinally displaceable manner on the upper longitudinal flange makes provision for the passage recess for the fastening means, which recess is provided in the region of one end of the sheet-metal material strip, to be provided with a collar and for the passage recess which is provided in the region of the other end of the sheet-metal material strip to encircle the collar.

In detail, in the case of a tarpaulin fastening of this type, provision can then expediently furthermore be made for both passage openings to have an excess size as compared with the fastening means and for the fastening means to engage on the metal clip by means of a pressure-distributing element, such as a washer.

The pressure-distributing element which transmits the holding force of one fastening element, which has a relatively small diameter, in a compatible manner to the metal clip is preferably of cup-shaped design and is provided in the centre with a passage opening for a rivet as the non-releasable fastening means.

The principle of the proposed tarpaulin fastening is based on the use of a metal clamp for transmitting the holding forces of the fastening element to the tarpaulin and therefore naturally also includes different shapes of metallic material than the shape of a flat material, in particular to the effect that instead of a sheet-metal strip a length section of a different shape of metallic material, for example round- or multi-edged material or else bundles of non-planar shapes of metallic material are used for forming a U-shaped clip.

Further advantages and features of the invention emerge from the following description and from the subclaims.

BRIEF DESCRIPTION OF THE DRAWINGS

The invention is explained in greater detail below using a preferred exemplary embodiment of a tarpaulin fastening according to the invention and by reference to the attached drawings.

DETAILED DESCRIPTION OF A PREFERRED EMBODIMENT

Figure 1:
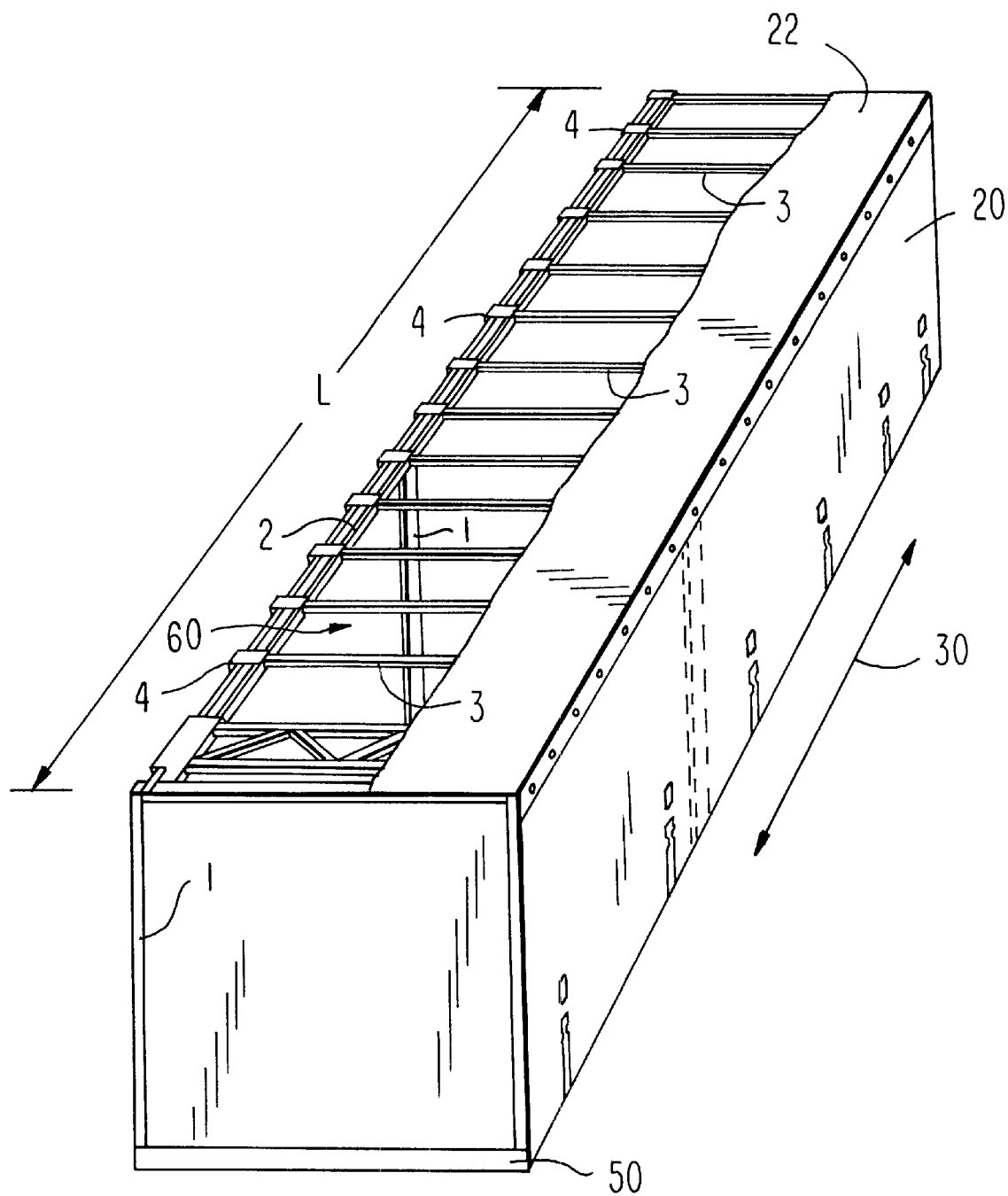
FIG. 1 shows a perspective view of a vehicle body provided with a tarpaulin structure.

In the case of a vehicle body which is illustrated schematically in FIG. 1 and is provided with a canopy or roof covering 22 which can be pushed together and side tarpaulins which can be pushed together. The canopy frame encloses a loading compartment 60 having a length L and mainly consists of upper longitudinal flanges 2 which span the length of the loading compartment and are supported against the vehicle chassis 50 via upwardly protruding supports 1, for example stakes. The bows 3 support roof covering 22, in particular a tarpaulin, and can be displaced in the longitudinal direction 30 of the vehicle. The bows 3 are supported on the upper longitudinal flanges 2. The longitudinally displaceable side tarpaulins 20 are suspended on the bows 3 via end caps or support elements 4 and fastenings 40 (FIG. 2), in other words, the side tarpaulins 20 hang from the end caps 4 via fastenings 40. End cap 4 thus has a side-wall tarpaulin support portion 34 for supporting the side-wall tarpaulin 20. Alternately, the support portion 34 may be on a hanging slider, which would slide for example in the upper longitudinal flanges.

Figure 2:
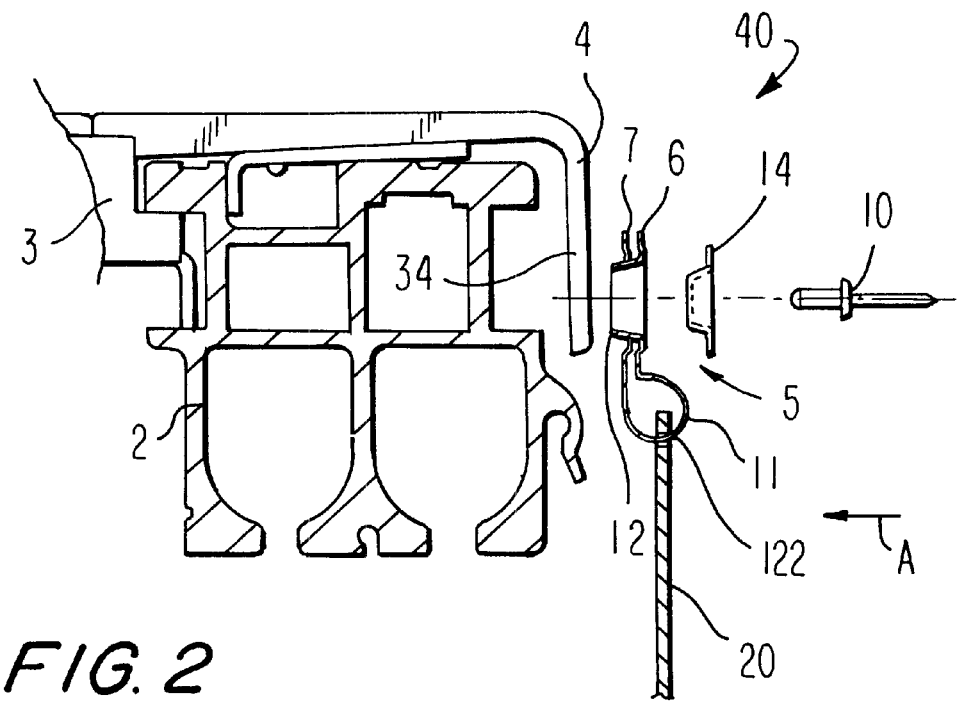
FIG. 2 shows a cross section through a preferred exemplary embodiment of a tarpaulin fastening according to the invention.

FIG. 2 shows bow 3 having end cap or support element 4 attached slidably on longitudinal flange 2, i.e. end cap 4 can slide in or out of the page while flange 2 is stationary as shown in FIG. 2. Fastening 40 may fasten the side tarpaulin 20 to the end cap or support element 4 of bow 3 as follows. Tarpaulin 20 has eyelets or recesses 122 and is provided with an edge reinforcement 120, for example an insert made of tension-proof material. Fastening 40 comprises a metal clip 5 formed by a strip-shaped sheet-metal material blank bent in the shape of a U. In the region of two ends 6 and 7 of the metal clip 5, respective passage recesses or openings 8 and 9 for a fastening bolt 10 of the fastening 40 are provided. The metal clip 5 passes through the eyelets or recesses 122 so that tarpaulin 20 hangs from a profile base of the metal clip 5.

Figure 3:
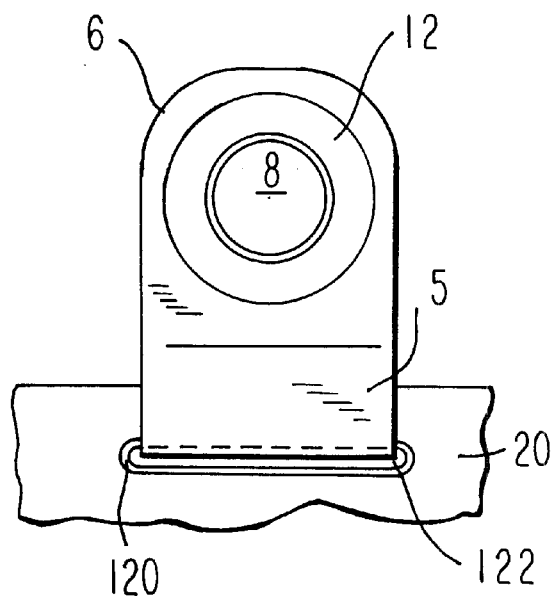
FIG. 3 shows a plan view, from the direction of the arrow A from FIG. 2, of a first end of a sheet-metal blank forming a clip.
Figure 4:
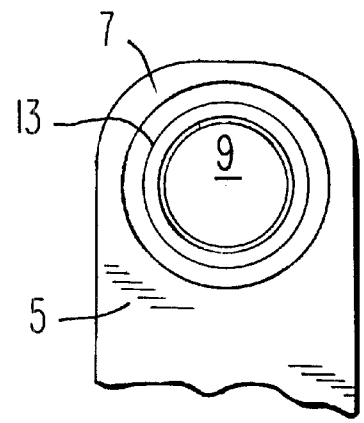
FIG. 4 shows a plan view, from the direction of the arrow A from FIG. 2, of a second end of the sheet-metal blank forming a clip.

In the profile base of its U-shape, the metal clip 5 has a bulge or base 11 passing through eyelets or recesses 122 of the tarpaulin 20. As shown in FIG. 3, passage recess or opening 8 for the fastening bolt 10 is provided in the region of the first end 6 of the sheet-metal material strip 5, and is provided with a collar 12. Passage recess or opening 9 is provided in the region of the second end 7 of the sheet-metal material strip 5 and encircles the collar 12 and is formed by a simple depression 13.

The two passage openings or recesses 8 and 9 have an excess size as compared with the fastening bolt 10, which is designed as a blind rivet or fastening bolt. The fastening bolt 10, which has a small diameter as a consequence of being designed as a blind rivet, engages the metal clip 5 by means of a pressure-distributing element 14, the pressure-distributing element 14 being designed as a cup-shaped washer and being provided with a centrally arranged passage opening, formed by openings 8, 9, for the fastening bolt or rivet 10. In the shown embodiment, bows 3 having end caps 4 thus support side tarpaulins 20, and can move the side tarpaulins 20 in longitudinal direction 30 by sliding end caps 4 along longitudinal flanges 2. Roof covering 22 is also supported by bows 3 and can be displaced longitudinally as well.

What is claimed is:

1. A fastening device in combination with a commercial vehicle having a loading compartment with a length, a vehicle chassis and at least one side-wall tarpaulin support portion for a side-wall tarpaulin, the fastening device for connecting an eyelet or recess of the side-wall tarpaulin to the side-wall tarpaulin support portion, comprising:

a roof covering for covering the loading compartment;

a plurality of upper longitudinal flanges spanning the length of the loading compartment and being supported on the vehicle chassis via upwardly protruding supports;

the side wall tarpaulin support portion being movable longitudinally with respect to one of the plurality of upper longitudinal flanges; and at least one fastening non-releasably fastening the side-wall tarpaulin to the side-wall tarpaulin support portion, the fastening including a U-shaped metal clip having two ends and a base connecting the two ends, the metal clip passing through the side-wall tarpaulin eyelet or recess, the fastening including a non-releasable fastening bolt passing through the two ends of the metal clip.

2. The fastening device according to claim 1, wherein said metal clip is designed as a strip-shaped, U-shaped sheet-material, and wherein said ends of said metal clip are each provided with a respective passage recess for said fastening bolt.

3. The fastening device according to claim 2, wherein a first of said passage recesses is provided with a collar, and wherein a second of said passage recesses surrounds said collar.

4. The fastening device according to claim 2, wherein the fastening further comprises a pressure-distributing element, said two passage recesses having an excess size as compared with said fastening bolt, and the fastening bolt engaging said metal clip through the pressure-distributing element.

5. The fastening device according to claim 4, wherein said pressure-distributing element is of cup-shaped design, and wherein said pressure-distributing element is provided in a center with a passage opening for said fastening bolt, said fastening bolt being a rivet.

6. The fastening device according to claim 1, wherein the base is rounded.

7. The fastening device according to claim 1, wherein the side-wall tarpaulin support portion is provided in one of a bow end gripping laterally over one of the longitudinal flanges and a hanging slider movable with respect to the longitudinal flanges.

8. The fastening device according to claim 1, wherein the roof covering is a tarpaulin.

9. The fastening device according to claim 1, wherein the side-wall tarpaulin support portion is a part of a bow connecting two of the longitudinal flanges and supporting the roof covering, the support portion being on a bow end cap at an end of the bow.

10. A commercial vehicle having a vehicle chassis and side tarpaulins which can be pushed together for accessing a loading compartment of said vehicle, the loading compartment having a length, the vehicle comprising:

a loading compartment frame including supports upwardly protruding from the vehicle chassis and including upper longitudinal flanges spanning the length of the vehicle compartment, the flanges being supported on the supports;

a roof covering the loading compartment;

a side-wall tarpaulin support portion movable longitudinally with respect to the upper longitudinal flanges;

a side-wall tarpaulin, the side-wall tarpaulin having an eyelet or recess, and at least one fastening passing through the eyelet or recess of the side-wall tarpaulin and being fastened to the side-wall support portion, the fastening device including a fastening bolt and a U-shaped metal clip, the metal clip having two ends and a base connecting the two ends, the fastening bolt non-releasably passing through the two ends of the metal clip.

11. The commercial vehicle according to claim 10, comprising a bow connecting two of the upper longitudinal flanges, the bow supporting the roof covering and an end of the bow defining the support portion.

12. The commercial vehicle according to claim 10, wherein the support portion is provided on an end of a bow connected between two of the upper longitudinal flanges or on a hanging slider connected to and movable with respect to one of the upper longitudinal flanges.

* * * * *